United States Patent [19]

Kramer et al.

[11] Patent Number: 4,646,940

[45] Date of Patent: Mar. 3, 1987

[54] METHOD AND APPARATUS FOR ACCURATELY MEASURING VOLUME OF GAS FLOWING AS A RESULT OF DIFFERENTIAL PRESSURE

[75] Inventors: Robert A. Kramer, Crown Point; Terrance P. Rusk, Hobart; David W. Salmons, Valparaiso, all of Ind.

[73] Assignee: Northern Indiana Public Service Company, Hammond, Ind.

[21] Appl. No.: 610,742

[22] Filed: May 16, 1984

[51] Int. Cl.⁴ .................. B67B 7/00; B67D 5/08
[52] U.S. Cl. .................................. 222/1; 222/3; 222/59; 141/197
[58] Field of Search ............ 222/1, 3, 14, 52, 54, 222/59; 73/861.01, 861.02; 137/486, 487.5; 141/192, 197, 39, 5

[56] References Cited

U.S. PATENT DOCUMENTS

| | | | |
|---|---|---|---|
| 2,160,766 | 5/1939 | Thomason | 137/486 |
| 2,718,144 | 9/1955 | Hornfeck | 73/861.02 |
| 3,516,429 | 6/1970 | Sandstede et al. | 137/487.5 |
| 3,701,280 | 10/1972 | Stroman | 73/861.02 |
| 3,750,472 | 8/1973 | Ducousset | 73/861.02 |
| 4,101,056 | 7/1978 | Mattimoe et al. | 222/26 |
| 4,397,405 | 8/1983 | Batson | 222/14 |
| 4,419,898 | 12/1983 | Zanker et al. | 73/861.02 |

FOREIGN PATENT DOCUMENTS 1064228  4/1967  United Kingdom ............... 222/59

Primary Examiner—Joseph J. Rolla
Assistant Examiner—Michael S. Huppert
Attorney, Agent, or Firm—Trexler, Bushnell & Wolters, Ltd.

[57] ABSTRACT

A method of accurately measuring volume of gas flowing through a conduit as a result of differential pressure of the gas within the conduit is disclosed. The method comprises determining flow of the gas through the conduit, and terminating flow of the gas through the conduit when the differential pressure is a preselected value. The gas flow and the resulting determination of gas volume are preferably referenced to standard temperature and pressure. Also disclosed is an apparatus for effecting the method.

7 Claims, 6 Drawing Figures

METHOD AND APPARATUS FOR ACCURATELY MEASURING VOLUME OF GAS FLOWING AS A RESULT OF DIFFERENTIAL PRESSURE

BACKGROUND OF THE INVENTION

This invention is directed to a novel method and apparatus for accurately measuring volume of gas flowing as a result of differential pressure. More particularly, the present invention is directed to a method and apparatus for accurately measuring volume of compressed natural gas (CNG) flowing into gas cylinders of a motorized vehicle, such as a truck, van, car and the like. Such gas volume is preferably referenced to standard temperature and pressure.

It is currently desirable to use CNG as an alternate but not simultaneous fuel in motorized vehicles using gasoline or diesel fuel. It is also desirable that the volume of CNG that is transferred into the CNG gas cylinders of such a motorized vehicle be known with a relatively acceptable degree of accuracy. It is further desirable that the method of filling such vehicle CNG gas cylinders be relatively quick.

Commercially available conversion kits for adapting vehicle engines to CNG operation are well known. However, commercially available equipment for recording volume of CNG transferred into such vehicles is either inaccurate, unreliable or both. For example, commercially available turbine meters have been observed to be high maintenance items; and a commercially available vibrating U-shaped sensor used for measuring mass flow rates was observed to develop inaccuracies as CNG specific gravity units (SGU's) varied.

OBJECTS AND SUMMARY OF THE INVENTION

It is therefore a general object of this invention to provide a method and an apparatus for accurately measuring volume of gas flowing as a result of differential pressure, the gas volume being referenced to a standard temperature and pressure.

A more specific object is to provide such a method and apparatus wherein the gas is CNG, and wherein the apparatus of the invention is relatively simple in operation and can readily be used for fueling a motor vehicle.

A still more specific object is to provide a relatively inexpensive apparatus, commercially available in conversion kit form, for use in fueling motor vehicles having conventional and CNG fuel delivery systems.

A further object is to provide such a method and apparatus, whereby volume of CNG transferred into the vehicle, through use of the apparatus, is relatively accurate.

Yet another object is to provide such an apparatus which permits relatively quick CNG refueling of the vehicle.

Briefly, and in accordance with the foregoing objects, a method according to the present invention of accurately measuring volume of gas flowing through a conduit as a result of differential pressure of the gas within the conduit will now be summarized. The method comprises determining flow of the gas through the conduit, and terminating flow of the gas through the conduit when the differential pressure is a preselected value. The gas flow and the resulting determination of gas volume are preferably referenced to standard temperature and pressure. An apparatus according to the present invention for effecting such a method will be described below in greater detail.

BRIEF DESCRIPTION OF THE DRAWINGS

The foregoing as well as other objects, features and advantages of the instant invention will become more readily understood upon reading the following detailed description of the illustrated embodiment, together with reference to the drawings, wherein.

DETAILED DESCRIPTION OF THE ILLUSTRATED EMBODIMENT

Figure 1:
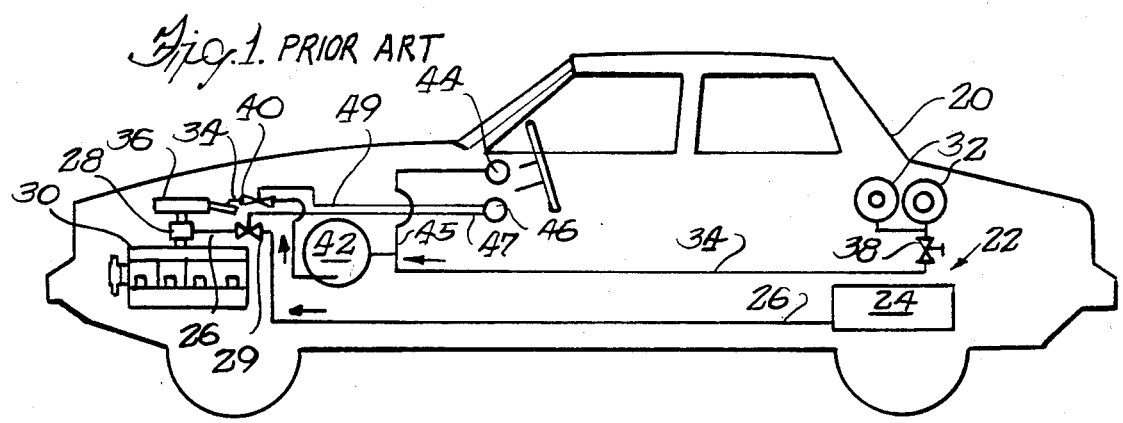
FIG. 1 is a schematic side view of an automobile having a first type of a commercially available gasoline and CNG fuel delivery system.

A motorized vehicle such as an automobile 20 having a first commercially available type of gasoline and CNG fuel delivery system 22 (FIG. 1) is briefly described as follows.

The first system 22 includes a gasoline tank 24 which is connected by a conduit 26 to a carburetor 28 atop the vehicle engine 30. The conduit 26 includes, between the carburetor 28 and gasoline tank 24, a gasoline flow check valve 29. The first system 22 further includes from one to six and illustrated as a pair of CNG storage cylinders 32 which are connected via a conduit 34 and through an air cleaner 36 to the carburetor 28. The cylinders 32 preferably are manifolded together and have a common valve 38, although each cylinder could have its own valve 38 for individually controlling CNG flow from such cylinder 32 into the conduit 34. Also included in the first system 22, preferably in the conduit 34 intermediate the air cleaner 36 and cylinders 32, are a CNG flow check valve 40, a CNG pressure reducer 42 and a pressure gauge 44, the gauge 44 preferably being viewable at the automobile dashboard for indicating pressure within the cylinders 32. The gauge 44 is connected by a conduit 45 to the conduit 34.

The first system 22 further includes a fuel selector switch 46, preferably mounted on the dashboard for easy access by a vehicle user and respectively connected to the gasoline and CNG flow check valves 29, 40 by connectors 47, 49, for selecting either CNG or gasoline (but not both) as fuel for the vehicle 20.

Figure 2:
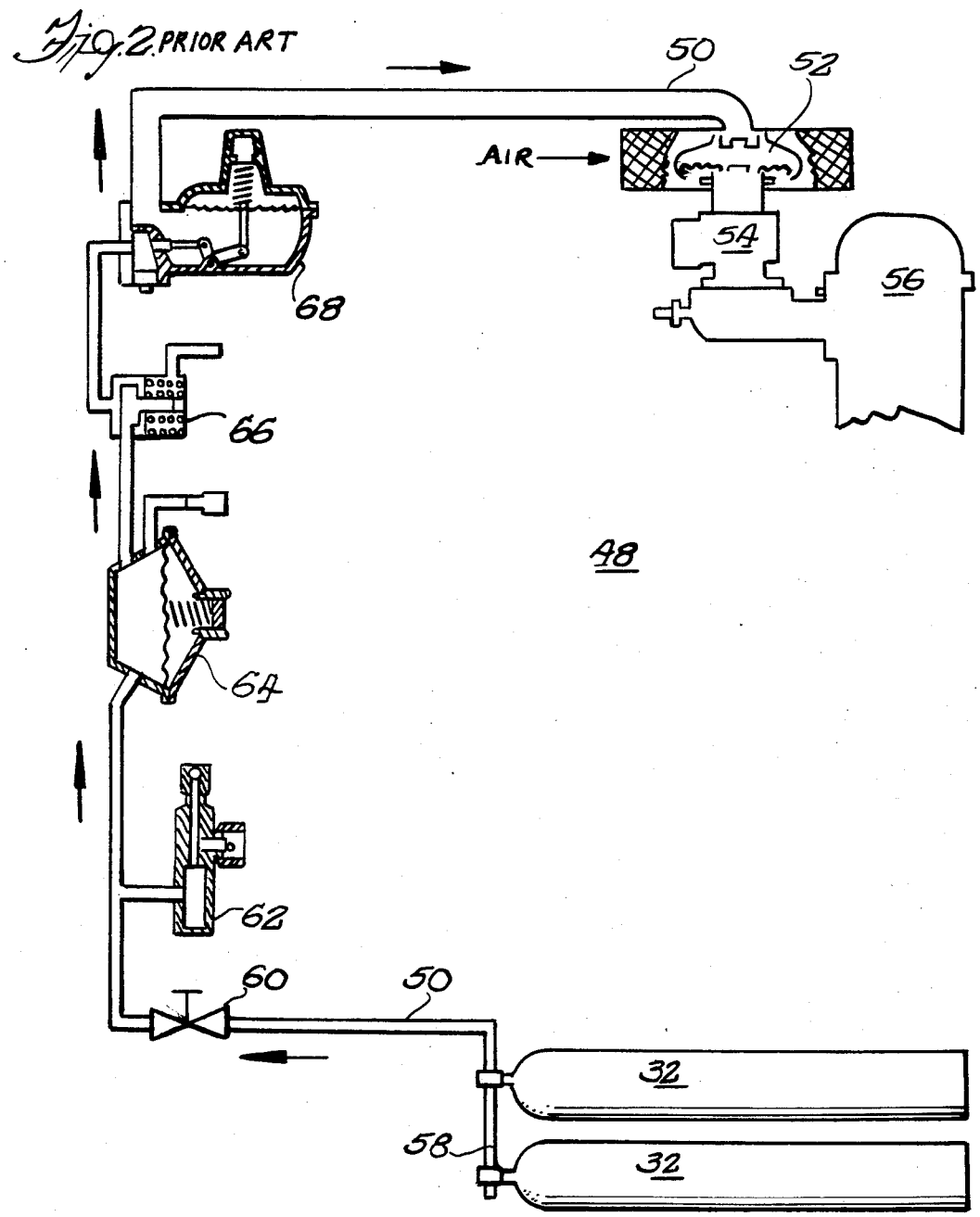
FIG. 2 is a schematic view of a CNG fuel delivery system portion of another such commercially available gas and CNG fuel delivery system for motor vehicles.

A second commercially available type of gasoline and CNG fuel delivery system 48 (FIG. 2) will now be discussed.

The second system 48 also preferably includes two cylinders 32 which are connected by a conduit 50 to an air-fuel mixer 52 atop another carburetor 54 of another vehicle engine 56. Each such cylinder 32 may have its own safety device, including a valve, although the cylinders are preferably manifolded together at 38 with safety devices downstream including a valve 60, for supplying CNG from such cylinder 32 to the conduit 50.

Throughout this application, reference to CNG storage cylinders will be understood to mean gas cylinders approved by the Department of Transportation (DOT) for CNG storage. For example, each such DOT approved cylinder typically holds approximately 300-500 standard cubic feet (SCF) of CNG at about 2400 pounds per square inch gauge (psig), compensated to 70 degrees Fahrenheit. In addition, such cylinders typically further include individual mounting brackets and safety vapor seals (which are not specifically shown herein). Moreover, "a standard cubic foot" for a gaseous hydrocarbon such as CNG refers to 1 cubic foot of gas at 60 degrees Fahrenheit and 14.696 psia.

The second system 48 further preferably includes, intermediate the cylinders 32 and mixer 52 and in the conduit 50, a CNG check valve 62, a first stage pressure regulator 64, a CNG fuel shut-off solenoid valve 66 and a low-pressure regulator 68. The first stage regulator 64 preferably has a 55 psig set point. The low pressure regulator 68 preferably supplies CNG to the mixer 52 at a pressure of about 0.5 inches of water.

Figure 3:
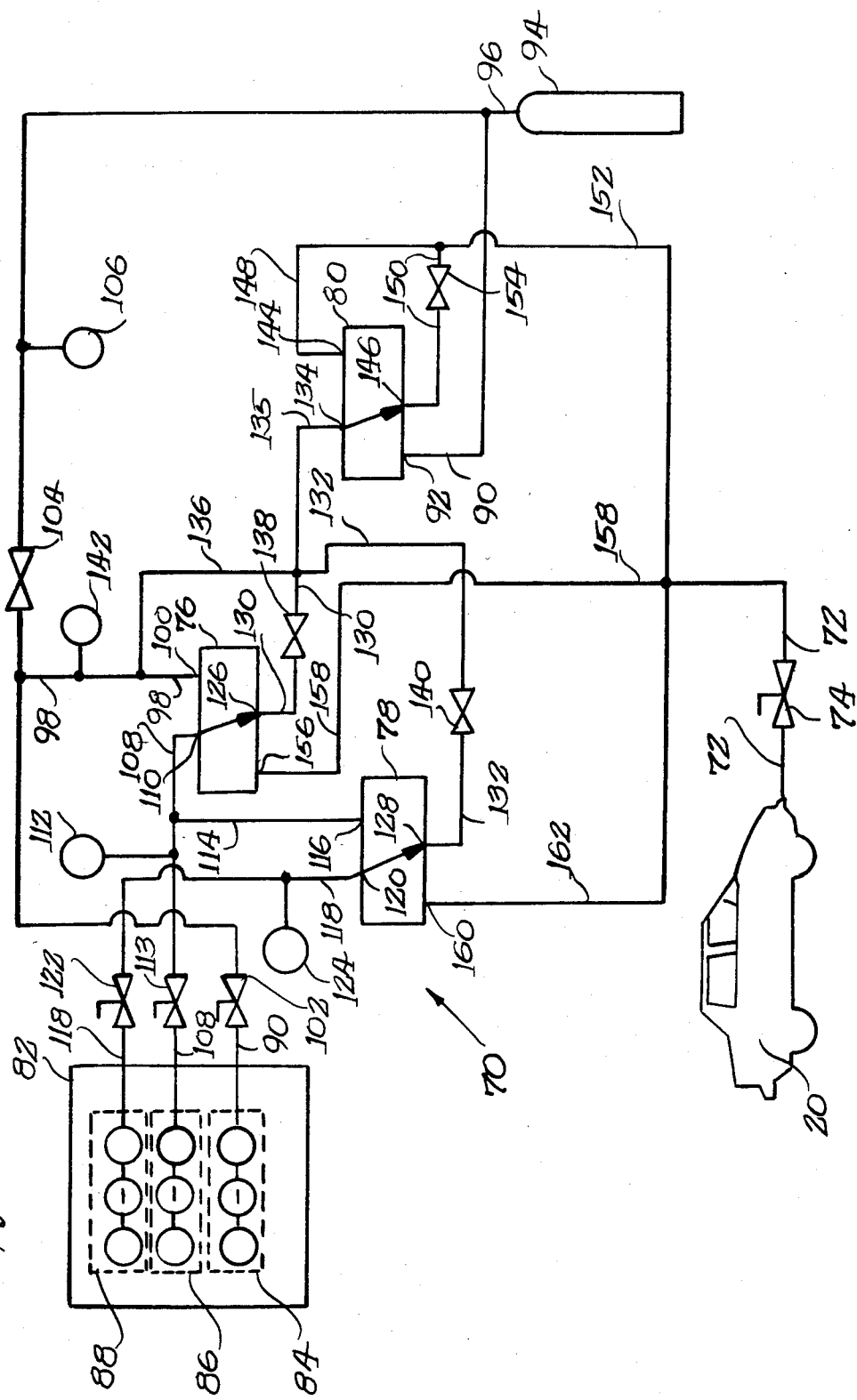
FIG. 3 is a schematic of a preferred manner of filling CNG cylinders of such vehicles.

A preferred system 70 (FIG. 3) for refueling the vehicle 20 with CNG will now be discussed.

The refueling system 70 includes a CNG supply conduit 72, preferably having a ball valve 74, for controlling flow of CNG into the vehicle 20. The system 70 further preferably includes first and second sequential valves 76, 78 and a dome loader valve 80. The valves 76, 78 and 80 are individually connected to separate banks of a CNG storage facility 82.

The storage facility 82 includes a basket of cylinders comprising a first or low-pressure bank 84 (preferably comprising eight CNG storage cylinders connected in series), a second or intermediate-pressure bank 86 (preferably comprising eight CNG storage cylinders connected in series), and a third or high-pressure bank 88 (preferably comprising four CNG storage cylinders connected in series).

The low-pressure bank 84 is preferably connected by a first conduit 90 to a normally open port 92 of the dome loader valve 80. Proximate to the dome loader valve 80, a reference cylinder 94 is preferably connected by a conduit 96 to the conduit 90. The conduit 90 is also preferably connected by a conduit 98 to a normally closed port 100 of the first sequential valve 76. The conduit 90 further preferably includes, intermediate the low-pressure bank 84 and the conduit 98, a ball valve 102 and, intermediate the conduits 96 and 98, a needle valve 104 and a pressure gauge 106.

A second conduit 108 preferably connects the intermediate-pressure bank 86 to an inlet port 110 of the first sequential valve 76. The conduit 108 includes a pressure gauge 112 and a ball valve 113, and is connected by yet another conduit 114 to a normally closed port 116 of the second sequential valve 78.

A third conduit 118 connects the high-pressure bank 88 to an inlet port 120 of the second sequential valve 78. The conduit 118 also preferably includes a ball valve 122 and a pressure gauge 124.

Respective outlet ports 126, 128 of the first and second sequential valves 76, 78 are connected via conduits 130, 132 to an inlet port 134 of the dome loader valve 80. The conduits 130, 132 are connected to a conduit 135 which is connected to the dome loader valve inlet port 134. The conduits 130, 132 are also preferably connected to the conduit 98 by a conduit 136. The conduits 130, 132 preferably further include respective check valves 138, 140, and the conduit 98 preferably includes a pressure gauge 142.

A normally closed port 144 and an output port 146 of the dome loader valve 80 are respectively connected by conduits 148, 150 to a first branch conduit 152 supplying the CNG supply conduit 72. The conduit 150 preferably includes a check valve 154. A normally open port 156 of the first sequential valve 76 is preferably connected by a second branch conduit 158 to the CNG supply conduit 72. A normally open port 160 of the second sequential valve 78 is preferably connected by a third branch conduit 162 to the CNG supply conduit 72.

As is well known, use of the system 70 to fill CNG gas cylinders of a vehicle 20 preferentially draws first from the low-pressure bank 84, then from the intermediate-pressure bank 86, and finally from the high-pressure bank 88.

Preferred operation of the system 70 for refueling the vehicle 20 with CNG will now be briefly discussed.

With the vehicle 20 connected to the CNG supply conduit 72, the ball valve 74 is opened causing the vehicle's cylinder pressure to be transmitted through above-described conduit of the system 70 back to the check valve 154, connected by the conduit 150 to the output port 146, of the dome loader valve 80.

The reference cylinder 94 is approximately at a pressure of about 2750 psig, compensated to 70 degrees Fahrenheit, and the normally-open port 92 of the dome loader valve 80, because it is connected by conduits 90, 96 to the reference cylinder 94, is similarly pressurized to about 2750 psig.

When the vehicle cylinder pressure is less than about 1500 psig, the dome loader valve 80 operates automatically. The check valve 154, moreover, automatically delays such automatic action of the dome loader valve 80 until the two sequential valves 76, 78 close.

When the sequential valves 76, 78 have closed and a sufficient system pressure has been achieved, CNG is drawn from the low-pressure cylinder bank 84 and into the vehicle 20. As vehicle cylinder pressure increases with transfer of CNG into such cylinders, such pressure increase is sensed at the normally-open ports 156, 160, respectively, of the sequential valves 76, 78.

With CNG being withdrawn from the low-pressure bank 84, cylinder pressure of the low-pressure bank 84 is, of course, decreasing, and is preferably being sensed at the normally-closed port 100 of the first sequential valve 76. Both sequential valves 76, 78, moreover, are preferably designed such that it takes relatively less pressure to open (than to close) them so that as the decreasing pressure of the low-pressure bank 84 approaches the vehicle cylinder pressure, sensed at the normally-open port 160 of the first sequential valve 76, the valve 76 will automatically open when vehicle cylinder pressure is within about 12% of the pressure within the cylinders of the low-pressure bank 84, thereby causing CNG to automatically be drawn from the intermediate-pressure bank 86. When pressure within bank 86 decreases sufficiently, as sensed at the normally-closed port 116 of the second sequential valve 78, the second sequential valve 78 will preferably automatically open allowing CNG to flow from the high-pressure bank 88 to the vehicle 20. When such occurs, all three valves 76, 78 and 80 will be open, but CNG will be flowing only through the second sequential valve 78 and the dome loader valve 80.

As the vehicle cylinders are thus being filled, increasing pressure is being sensed at the normally-open port 92 of the dome loader valve 80. When such pressure is preferably slightly more than the above-mentioned pressure within the reference cylinder 94, the dome loader valve 80 will preferably automatically close thereby terminating the above-described vehicle-fill operation.

With vehicle CNG cylinders filled, a vehicle operator can close ball valve 74, remove the CNG supply conduit 72 from the vehicle 20, and drive the vehicle 20 away.

It will be appreciated that pressures within the dome loader valve 80 will vary with temperature, and that the dome loader valve 80 thereby provides a temperature-compensation control for the system 70. For example, on relatively cold days (i.e., below 70 degrees Fahrenheit), the pressure within the reference cylinder 94 will be less than 2750 psig, and on relatively warmer days (i.e., above 70 degrees Fahrenheit), the pressure within the reference cylinder 94 will be greater than 2750 psig.

The apparatus 164 of the instant invention (FIG. 4) is preferably used intermediate the vehicle 20 and the refueling system 70 (FIG. 3) for obtaining a relatively accurate volume determination of CNG transferred from the storage facilties 82 (FIG. 3) into the vehicle 20. The gas volume is preferably referenced to standard temperature and pressure. It is well known that "standard conditions" for gases are 14.696 psia (pounds per square inch absolute) and 60 degrees Fahrenheit.

Figure 4:
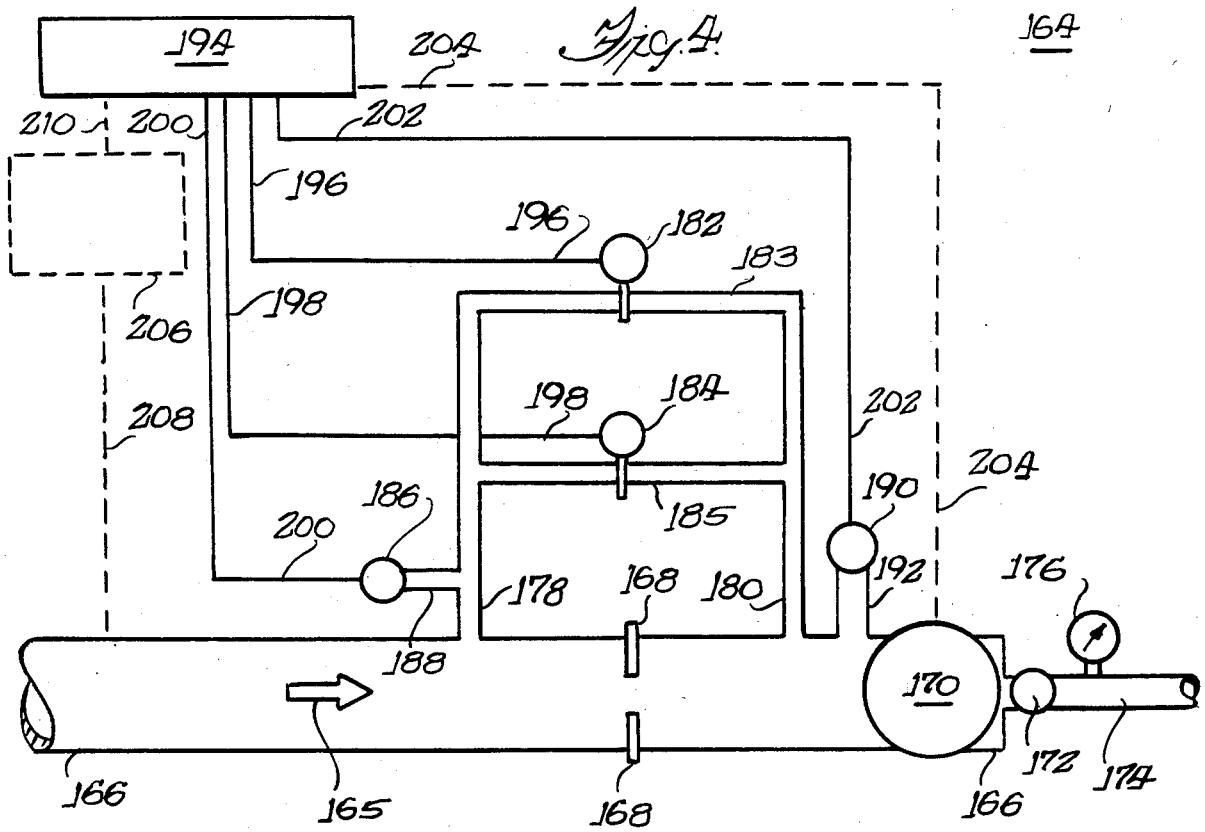
FIG. 4 is a schematic of a preferred embodiment of the apparatus of the instant invention.

A preferred embodiment of the apparatus 164 of the instant invention will now be discussed. CNG flow through the apparatus 164 is as depicted by the arrow 165 (FIG. 4).

The apparatus 164 preferably includes a conduit 166, an orifice plate 168 disposed in the conduit 166 transverse to the direction of CNG flow (in the conduit 166), a gas flow-control valve 170 and an on/off valve 172.

Figure 5:
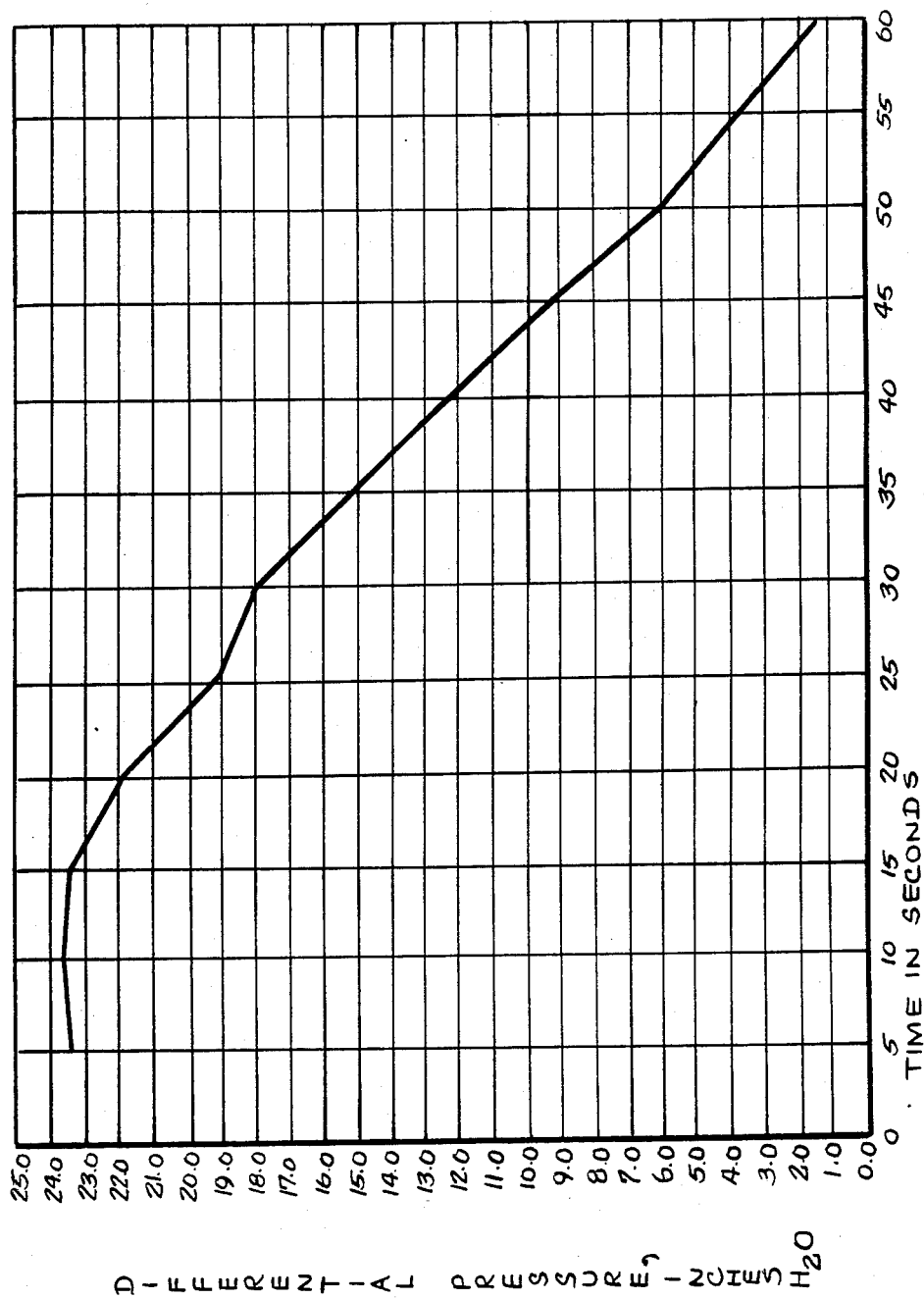
FIG. 5 is a graph depicting time to fill CNG vehicle cylinders using the apparatus of the instant invention.

Preferred flow rate of CNG through the conduit 166 ranges from about 50-600 standard cubic feet per minute (SCFM), 200 SCFM being the more preferred flow rate. The conduit 166 has a preferred inner diameter of no more than about 1.5 inches, and the orifice plate 168 has a preferred inlet diameter of no more than about 0.4 inches. More preferably, however, the conduit 166 has an inner diameter of about $\frac{3}{4}$ inches, and the orifice plate 168 has a correspondingly reduced inlet diameter. The orifice plate 168, fitting within the $\frac{3}{4}$ inch conduit 166, is accordingly preferably sized to effect noted pressure drop (FIG. 5).

The gas flow-control valve 170 is preferably an automatic solenoid controlled valve, and the on/off valve 172 is preferably a $\frac{1}{4}$ inch turn on/off valve.

The conduit 166 is preferably connected to a nominal $\frac{1}{4}$ inch flow line 174 having a pressure gauge 176 attached thereto.

It is well known that flow through a conduit effects pressure drop of the fluid flowing therethrough. This holds true whether the fluid is a liquid, gas or comprises both. It is also well known that an orifice plate, disposed in a pipe transverse to flow so as to form a restriction and thereby cause pressure drop, can be the basis of a flow meter.

It is further well known that in certain applications, fluid flow through such an orifice plate-based flow meter is preferably turbulent, for meter accuracy purposes.

It has in fact been observed that CNG flow through the conduit 166 is turbulent, and it has been estimated that such flow approaches sonic flow.

Calculation of flow from orifice data is well known. Reference texts (see Notes on Transfer Operations by R. A. Greenkorn and D. P. Kessler, Chapter 4, pp. 24-30, published by Purdue University, circa 1970; and *Chemical Engineer's Handbook*, 4th Ed., by J. H. Perry, R. H. Perry, C. H. Chilton and S. D. Kirkpatrick, McGraw-Hill Book Company, Inc., pp. 5-10 through 5-12 and 22-21), however, warn that flow disturbances in a conduit in the vicinity of an orifice plate can affect flow calculations, and suggest that fittings (i.e., such as tap conduit connections) be relatively spaced from the orifice plate for obtaining relatively accurate pressure drop information thereacross.

In the present apparatus 164 (FIG. 4), however, it has been discovered that first (or upstream) and second (or downstream) tap conduits 178, 180 can be spaced relatively close to the orifice plate 168 without affecting relative accuracy of CNG flow calculation through the orifice plate 168. It has further been discovered that a first (or high-pressure range) differential pressure transmitter 182 and a second (or low-pressure range) differential pressure transmitter 184 can be connected in parallel by conduits 183, 185 across the upstream and downstream tap conduits 178, 180 for achieving surprisingly accurate volume determination of CNG transferred from the storage facilities 82 into the vehicle 20. A more detailed description of these high- and low-pressure range differential pressure transmitters 182, 184 will be presented below. Preferably, the gas volume is referenced to standard temperature and pressure, but can be based upon another temperature and pressure, if desired.

The upstream tap conduit 178 preferably includes a static pressure transmitter 186, preferably having an operating range of from about 0-4000 psig, which is connected to the upstream tap conduit 178 by a nipple 188.

The pressure rating of the conduit 166 is preferably about 0-6000 psig, so as to transfer effectively into the cylinders 32 CNG pressurized to about 3600 psig, compensated to 70 degrees Fahrenheit.

Downstream of the second tap conduit 180, the CNG transfer conduit 166 preferably includes a temperature transmitter 190, preferably having an operating range of from about −30 to about 120 degrees Fahrenheit, which is spaced relatively closely to the orifice plate 168 and connected to the conduit 166 by a second nipple 192.

The high-pressure range differential pressure transmitter 182 preferably has an operating differential pressure range of about 0-150 inches of water, and more preferably has an operating differential pressure range of about 0-100 inches of water.

The low-pressure range differential pressure transmitter 184 preferably has an operating differential pressure range of about 0-30 inches of water, and more preferably has an operating differential pressure range of about 0-6 inches of water.

A commercially available flow computer 194 is connected via respective connectors 196, 198, 200 and 202 to the high- and low-pressure range differential pressure transmitters 182, 184 and to the static pressure and temperature transmitters 186, 190. (See FIG. 4.) The flow computer 194 can also be connected by yet another connector 204 to the gas flow control valve 170, whereby the flow computer 194 controls operation of the valve 170 for controlling CNG flow through the conduit 166.

It has been estimated that specific gravity of CNG used in the apparatus 164 will vary by as much as 20%. Specific gravity of CNG has in fact been observed to vary from about 0.57 to about 0.64 SGU's. In addition, it has been observed that molar percentages of carbon dioxide and nitrogen present in the CNG vary considerably as between CNG suppliers.

Moreover, the CNG composition of the low-pressure bank 84 may vary appreciably from the CNG composition of the intermediate-pressure bank 86, and the high pressure bank 88 may also vary appreciably in CNG composition from either or both of these banks 84, 86, because of the way the CNG storage facilities 82 are refilled. For example, typically, compressors (not shown) preferably begin refilling the low-pressure bank 84 before any CNG is removed from the intermediate- or high-pressure banks 86, 88. In such a case, the high-pressure bank 88 may not be used for vehicle refueling for several days.

SGU and mole percentage differences in CNG will, of course, affect compressibility considerations when calculating CNG flow.

All of the above-discussed variations can (and do) affect the accuracy of the CNG volume calculation of the apparatus 164. Accordingly, periodic adjustments are made to the flow computer 194 to compensate for these variations so that relatively accurate CNG flow determination can be made for correspondingly relatively accurate CNG volume determinations. Alternatively, a specific gravity determinator 206 (such as a calorimeter, a gas chromatograph, a mass gravitometer or another suitable device) can be coupled by a conduit 208 to the CNG transfer conduit 166 for obtaining a gas sample from the conduit 166, and the determinator 206 can further be connected by a connector 210 to the flow computer 194 to supply the flow computer 194 with relatively precise CNG specific-gravity or relative-composition information, as desired. With gas temperature, pressure and relative composition known, the flow computer 194 preferably automatically compensates the CNG volume calculation to account for gas compressibility factors.

Relatively fast fill of vehicle cylinders 32 is desirable. The apparatus 164 of the present invention accordingly permits relatively rapid filling of such a cylinder 32 in about two minutes. (See FIG. 5.) Out-of-door (i.e., subject to seasonal temperature variation) operation of the apparatus 164, moreover, has not been observed noticeably to affect the below-described gas volume-measurement accuracy of the apparatus 164.

Advantageously, the above-described apparatus 164 permits a user controllably to measure a relatively small differential pressure across the orifice plate 168.

It has been observed that when CNG gas flow through the conduit 166 is abruptly terminated such that pressure differential across the orifice plate 168 approaches zero, unacceptable inaccuracies arise in the CNG volume calculation. (See FIG. 6.) Similarly, undesirable CNG volume calculation inaccuracies arise when the flow cutoff differential pressure is more than about 2 inches of water pressure. Accordingly, the preferred CNG flow cutoff differential pressure across the orifice plate 168 is between 1-2 inches of water, pressure differential, and the more preferred cutoff is at about 1 inch of water, pressure differential. The fill time is not susceptible to generalization, but varies from one vehicle to another in accordance with the number and size of cylinders. It can be appreciated, because of mechanical friction, hysteresis and other effects, that a preferred pressure differential flow cutoff of 1 inch of water pressure generally results in an actual flow cutoff pressure differential ranging from about 0.7-1.4 inches of water pressure, which is in accordance with the objects of the instant invention.

The apparatus 164 (FIG. 4) is preferably used to fill substantially empty cylinders 32 with CNG, but can also be used to fill cylinders 32 which are not necessarily empty at the start but are filled to a full condition. If a cylinder is filled to a substantially full condition, regardless of the starting contents of the cylinder, accuracy is excellent. The meter measures the pressure differential every two seconds. If cutoff occurs one second after the last reading, accuracy is still good when the flow rate and the pressure differential are low as is the case when a cylinder is full. However, if it is desired to cut off with a partial fill, say with a 4-inch water pressure differential, the flow rate will be high and the one second time lag may result in a significant error.

Figure 6:
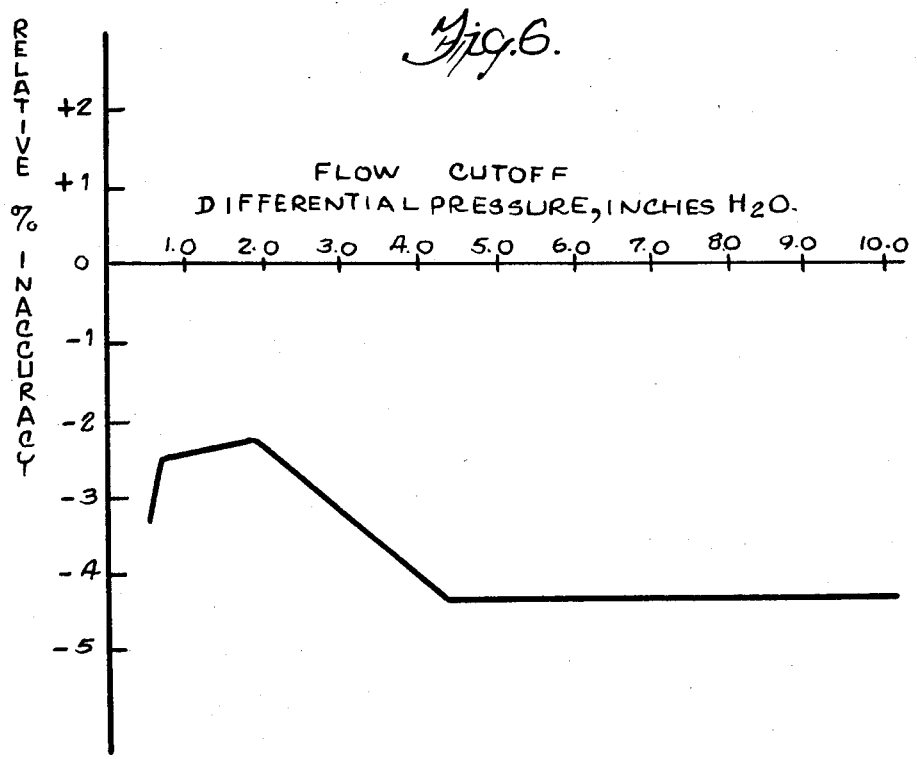
FIG. 6 is a graph depicting preferred CNG flow cutoff pressure to such vehicle cylinders.

Although FIG. 6 presents one observed case where relative percentage inaccuracies were determined to be between 2-3%, it has also been observed that use of the apparatus 164 results in a CNG volume accuracy calculation, the gas volume preferably being referenced to standard temperature and pressure, of at least about 99% over the entire above-mentioned gas-flow range, on the average.

The first and second of the above-described delivery systems 22, 48 (FIGS. 1, 2) provide an equivalent of about 2.5-3.0 gallons of gasoline per cylinder 32. In other words, when two such cylinders 32 are employed in the vehicle 20, the CNG contained in such cylinders 32, when pressurized to 2400 psig (compensated to 70 degrees Fahrenheit), provides the vehicle 20 with enough CNG to propel the vehicle 20 equivalent to a distance which would be obtained from 5-6 gallons of gasoline.

The experimental procedure for verifying accuracy of the apparatus 164 will now be discussed. The experimental procedure consisted of introducing into a CNG test cylinder (not shown) a quantity of CNG at a known test-cylinder internal temperature and pressure, then exhausting the CNG from the test cylinder and through a regulated commercially available gas meter to determine actual volume of CNG which had been in the test cylinder. The test cylinder was then used to measure the relative accuracy of the apparatus 164. Care was exercised to avoid leakage of CNG from the apparatus 164, the test cylinder and the regulated gas meter.

What has been illustrated and described herein is a method and an apparatus for accurately measuring volume of gas flowing as a result of differential pressure.

Preferably, the gas volume thus determined is referenced to standard temperature and pressure (i.e., 60 degrees Fahrenheit and 14.696 psia). While the invention has been illustrated and described with reference to several preferred embodiments, the invention is not limited thereto. On the contrary, alternatives, changes and modifications may become apparent to those skilled in the art upon reading the foregoing description. Accordingly, such alternatives, changes and modifications are to be considered as forming a part of the invention insofar as they fall within the spirit and scope of the appended claims.

We claim:

1. A method of accurately measuring volume and terminating transient flow of compressed natural gas flowing turbulently as a gas through a conduit including an orifice plate to fill a vehicle fuel tank as a result of differential pressure of said gas within said conduit across said orifice plate, said compressed natural gas transiently flowing very rapidly at the start of a filling operation and slowing as said fuel tank approaches full, comprising: determining flow of said gas through said conduit at repeating short time intervals from the start of flow through measurement of differential pressure across said orifice plate; and terminating flow of said gas through said conduit when said differential pressure is a preselected value equal to substantially 1–2 inches of water pressure, said gas volume being referenced to a predetermined temperature and pressure.

2. The method as set forth in claim 1 wherein each short time interval is on the order of two seconds.

3. An apparatus for accurately measuring volume and terminating transient flow of compressed natural gas flowing turbulently as a gas through a conduit to fill a vehicle fuel tank as a result of differential pressure of said gas within said conduit comprising means including at least one storage tank providing a supply of compressed natural gas, a conduit connected to said supply means, means for connecting said conduit to a vehicle fuel tank for filling said tank with compressed natural gas, said compressed natural gas transiently flowing very rapidly at the start of a filling operation and slowing as said fuel tank approaches full, means for determining flow of said gas through said conduit including means providing an orifice in said conduit, differential pressure transducer means connected to said conduit across and relatively close to said orifice; flow computer means connected to said differential pressure transducer means and repetitively measuring the differential pressure across said orifice at short time intervals, and valve means in said conduit downstream of said orifice providing means connected to said flow computer means for terminating flow of said gas through said conduit when said differential pressure is a preselected value, said gas volume being referenced to a predetermined temperature and pressure.

4. Apparatus as set forth in claim 3 wherein the pressure differential is recomputed on the order of substantially every two seconds.

5. Apparatus as set forth in claim 4 wherein said flow computer means closes said valve when the differential pressure is equal to substantially 1–2 inches of water.

6. Apparatus as set forth in claim 3 wherein said flow computer means closes said valve when the differential pressure is equal to substantially 1–2 inches of water.

7. Apparatus as set forth in claim 3 wherein the differential pressure transducer means comprises a high pressure differential transducer means and a low pressure differential transducer means connected in parallel with one another to said conduit across said orifice.

* * * * *